United States Patent
Hiraiwa et al.

(10) Patent No.: US 10,003,082 B2
(45) Date of Patent: Jun. 19, 2018

(54) ELECTRODE CATALYST MATERIAL, FUEL CELL ELECTRODE, METHOD FOR PRODUCING ELECTRODE CATALYST MATERIAL, AND FUEL CELL

(71) Applicant: SUMITOMO ELECTRIC INDUSTRIES, LTD., Osaka-shi, Osaka (JP)

(72) Inventors: Chihiro Hiraiwa, Itami (JP); Naho Mizuhara, Itami (JP); Masatoshi Majima, Itami (JP); Takahiro Higashino, Itami (JP); Aiko Tominaga, Osaka (JP); Junji Iihara, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 163 days.

(21) Appl. No.: 14/913,395

(22) PCT Filed: May 15, 2014

(86) PCT No.: PCT/JP2014/062952
§ 371 (c)(1),
(2) Date: Feb. 22, 2016

(87) PCT Pub. No.: WO2015/029506
PCT Pub. Date: Mar. 5, 2015

(65) Prior Publication Data
US 2016/0248101 A1    Aug. 25, 2016

(30) Foreign Application Priority Data

Aug. 30, 2013   (JP) .................. 2013-179937

(51) Int. Cl.
H01M 8/10    (2016.01)
H01M 4/90    (2006.01)
(Continued)

(52) U.S. Cl.
CPC ....... *H01M 4/9025* (2013.01); *H01M 4/8652* (2013.01); *H01M 4/8657* (2013.01);
(Continued)

(58) Field of Classification Search
CPC ..................................... H01M 4/00
See application file for complete search history.

(56) References Cited

U.S. PATENT DOCUMENTS

| | | | |
|---|---|---|---|
| 2008/0038611 A1* | 2/2008 | Sprenkle | H01M 4/8885 429/466 |
| 2013/0095408 A1* | 4/2013 | Jung | H01M 8/1213 429/482 |

FOREIGN PATENT DOCUMENTS

| | | |
|---|---|---|
| JP | H06-349499 A | 12/1994 |
| JP | 2005-158377 A | 6/2005 |

(Continued)

*Primary Examiner* — Jacob Marks
(74) *Attorney, Agent, or Firm* — Drinker Biddle & Reath LLP

(57) ABSTRACT

Provided is an electrode catalyst material that has an increased reduction rate of a nickel catalyst and thus an improved catalytic function in a fuel cell. The electrode catalyst material for fuel cells contains nickel oxide and cobalt oxide. The electrode catalyst material contains a cobalt metal component in an amount of 2 to 15 mass % with respect to the total mass of a nickel metal component and the cobalt metal component.

11 Claims, 8 Drawing Sheets

(51) Int. Cl.
*H01M 4/86* (2006.01)
*H01M 4/88* (2006.01)
*H01M 8/12* (2016.01)
*H01M 8/124* (2016.01)

(52) U.S. Cl.
CPC ......... *H01M 4/885* (2013.01); *H01M 4/9033* (2013.01); *H01M 8/12* (2013.01); *H01M 4/8875* (2013.01); *H01M 2004/8684* (2013.01); *H01M 2008/1293* (2013.01)

(56) References Cited

FOREIGN PATENT DOCUMENTS

| | | | |
|---|---|---|---|
| JP | 2006-318769 | A | 11/2006 |
| JP | 2008-140652 | A | 6/2008 |
| JP | 2010-232134 | A | 10/2010 |
| JP | 2013-161662 | A | 8/2013 |

* cited by examiner

FIG. 3

| SAMPLE NAME | NiO POWDER | Co(NO$_3$)$_2$·6H$_2$O | Fe(NO$_3$)$_3$·9H$_2$O |
|---|---|---|---|
| NiCo-04 | 18.319g | 2.960g | |
| NiCo-07 | 17.747g | 5.179g | |
| NiCo-10 | 17.175g | 7.399g | |
| NiCo-50 | 9.541g | 36.995g | |
| NiCo-90 | 1.908g | 66.592g | |
| NiFe-04 | 18.319g | | 4.340g |
| NiFe-07 | 17.750g | | 7.595g |
| NiFe-10 | 17.175g | | 10.850g |
| NiFe-50 | 9.541g | | 54.252g |
| NiFe-90 | 1.908g | | 66.592g |

REDUCTION RATE OF COMPOSITE CATALYST
CONTAINING Ni OXIDE AND Co OXIDE

| SAMPLE NAME | Ni REDUCTION RATE (%) | Co REDUCTION RATE (%) | TOTAL REDUCTION RATE (%) |
|---|---|---|---|
| NiO | 92 | | |
| NiCo-04 | 100 | 62 | 98 |
| NiCo-07 | 100 | 65 | 98 |
| NiCo-10 | 100 | 82 | 98 |
| NiCo-50 | 91 | 93 | 92 |
| NiCo-90 | 79 | 100 | 98 |

REDUCTION RATE OF COMPOSITE CATALYST CONTAINING Ni OXIDE AND Fe OXIDE

|         | Ni REDUCTION RATE (%) | Fe REDUCTION RATE (%) | TOTAL REDUCTION RATE (%) |
|---------|-----------------------|-----------------------|--------------------------|
| NiO     | 92                    |                       |                          |
| NiFe-04 | 100                   | 29                    | 97                       |
| NiFe-07 | 100                   | 31                    | 95                       |
| NiFe-10 | 97                    | 24                    | 90                       |
| NiFe-50 | 69                    | 43                    | 56                       |
| NiFe-90 | 32                    | 80                    | 75                       |

REDUCTION RATE OF COMPOSITE CATALYST CONTAINING Ni OXIDE AND Fe OXIDE

ELECTRODE CATALYST MATERIAL, FUEL CELL ELECTRODE, METHOD FOR PRODUCING ELECTRODE CATALYST MATERIAL, AND FUEL CELL

TECHNICAL FIELD

The present invention relates to, for example, electrode catalyst materials for solid oxide fuel cells. More particularly, the present invention relates to, for example, an electrode catalyst material and a fuel cell electrode that have an increased reduction rate and thus an improved catalytic activity and to a method for producing the electrode catalyst material.

BACKGROUND ART

Solid oxide fuel cells (hereinafter referred to as "SOFCs") include a solid electrolyte-electrode layered body in which an anode and a cathode are provided on both sides of a solid electrolyte layer.

Examples of materials for forming the solid electrolyte layer in the SOFC include perovskite-type oxides, such as yttria-stabilized zirconia (hereinafter YSZ), yttrium-doped barium cerate (hereinafter BCY), and yttrium-doped barium zirconate (henceforth BZY).

An anode of the SOFC is typically formed by adding a catalyst component to a solid oxide for forming a solid electrolyte layer. Precious metals, such as platinum, can be used as the catalyst component, but precious metals have a drawback of high production costs. To avoid such a disadvantage, inexpensive nickel (Ni) can be used as a catalyst.

CITATION LIST

Patent Literature

PTL 1: Japanese Unexamined Patent Application Publication No. 2013-161662

SUMMARY OF INVENTION

Technical Problem

When nickel (Ni) is used as a catalyst in an electrode, for example, a nickel oxide powder is added to a powder material for forming a solid electrolyte, and the resulting material mixture is molded into a particular shape, then sintered, and reduced to obtain a catalytic function. Thus, a higher reduction rate may result in a higher catalytic function.

However, the nickel reduction rate in known electrodes in SOFCs has been about 90%, which indicates that catalysts fail to exhibit a sufficient catalytic function.

The present invention has been made to solve the above-mentioned problem. It is an object of the present invention to provide an electrode catalyst material that has an increased reduction rate and thus an improved catalytic function in a fuel cell.

Solution to Problem

According to an aspect of the present invention, an electrode catalyst material for fuel cells contains nickel oxide and cobalt oxide. The electrode catalyst material contains a cobalt metal component in an amount of 2 to 15 mass % with respect to the total mass of a nickel metal component and the cobalt metal component.

According to an aspect of the present invention, a method for producing an electrode catalyst material for fuel cells that contains nickel oxide and cobalt oxide includes a step of adding the cobalt oxide to the nickel oxide by an impregnation method in such a manner that the electrode catalyst material contains a cobalt metal component in an amount of 2 to 15 mass % with respect to the total amount of a nickel metal component and the cobalt metal component.

According to an aspect of the present invention, an electrode catalyst material for fuel cells contains nickel oxide and iron oxide. The electrode catalyst material contains an iron metal component in an amount of 2 to 10 mass % with respect to the total mass of a nickel metal component and the iron metal component.

According to an aspect of the present invention, a method for producing an electrode catalyst material for fuel cells that contains nickel oxide and iron oxide includes a step of adding the iron oxide to the nickel oxide by an impregnation method in such a manner that the electrode catalyst material contains an iron metal component in an amount of 2 to 10 mass % with respect to the total amount of a nickel metal component and the iron metal component.

Advantageous Effects of Invention

The power generation efficiency of fuel cells can be improved by increasing the reduction rate of nickel oxide to increase the amount of nickel metal involving catalytic reactions.

BRIEF DESCRIPTION OF DRAWINGS

FIG. 3 is a table showing the amount of a powder material added for producing each sample according to an embodiment.

DESCRIPTION OF EMBODIMENT

Figure 1:
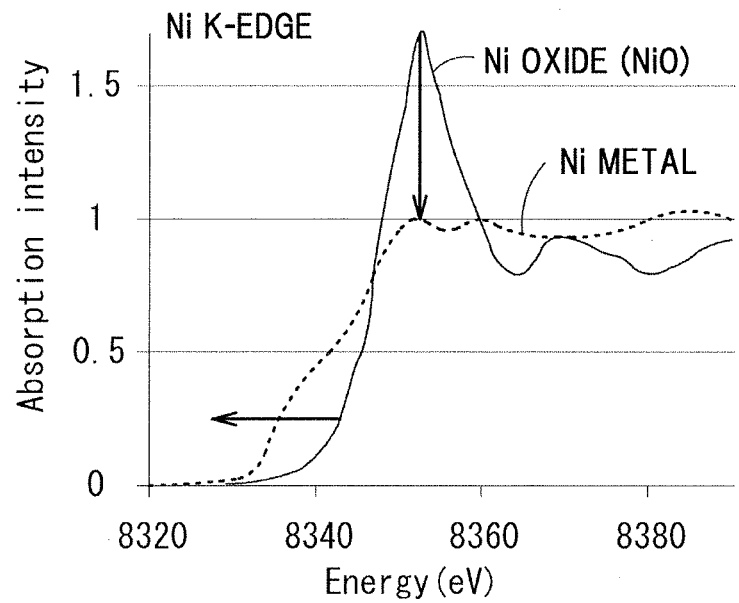
FIG. 1 is a graph showing example data of nickel oxide (NiO) and nickel metal measured by X-ray absorption fine structure (XAFS) spectroscopy.

[Reduction of Ni Catalyst in Fuel Cell Electrode]

A nickel catalyst component contained in a fuel cell electrode is present as an oxide at the beginning of incorporation of the nickel catalyst component into the fuel cell. To activate the catalytic function of the nickel to extract electric power from the fuel cell, the nickel oxide in the electrode needs to be reduced to nickel metal. To achieve this, an electrolyte-electrode layered body in the fuel cell is heated and reacted with hydrogen in an initial reduction process. When the nickel oxide is not reduced sufficiently in this initial reduction process, the performance of the fuel cell deteriorates. This suggests that the performance of fuel cells improves as the reduction level of nickel oxide increases.

In the related art, the initial reduction process involves measuring the voltage between electrodes or monitoring changes in the amount of fuel gas supplied and the partial pressure of water vapor in exhaust gas to determine whether the reduction to Ni is sufficiently performed. However, the reduction level measured by such methods varies with, for example, the concentration and flow rate of hydrogen gas, resulting in a failure to accurately determine the actual reduction state of nickel.

The present inventors have developed a method for accurately measuring the reduction state of nickel oxide in the initial reduction process without using an actual fuel cell and have thus completed the present invention using this method.

[Measurement of Reduction Rate]

In this embodiment, the reduction rate of nickel oxide is determined using X-ray absorption fine structure (hereinafter referred to as XAFS) spectroscopy with a device that can reproduce, for example, a reducing atmosphere in an electrode in a fuel cell. The reduction rate refers to a mass ratio (mass %) of reduced nickel metal to a nickel metal component in a catalyst added.

An XAFS spectrum is obtained by excitation of inner electrons with X-ray irradiation and provides information about each element of interest. XAFS is divided into XANES (X-ray absorption near edge structure) and EXAFS (extended X-ray absorption fine structure) in accordance with the energy range and the excitation process. XANES is a spectrum structure that is based on excitation of electrons to unoccupied orbitals and varies with, for example, the valence and coordination structure of an element of interest. EXAFS is a vibrational structure obtained on the basis of interaction between excited electrons and scattered electrons from neighboring atoms. The radial distribution function obtained by the Fourier transform includes information about the local structure (kinds of neighboring atoms, and atomic spacing) of an element of interest. In particular, XAFS spectroscopy can measure a change in the reduction state of an element of interest by reaction with a reducing gas ($H_2$) in a heating atmosphere. XAFS spectroscopy thus enables measurement without using actual fuel cells while precisely reproducing the initial reduction process of fuel cells.

[Overview of Measurement Procedure]

A procedure for measuring the reduction rate in this embodiment is described below. In this embodiment, the reduction rate is measured in a He gas atmosphere containing 10% of $H_2$ gas while a sample is heated to 400° C. FIG. 1 shows an example of a change in the K-edge absorption spectrum of XANES in the process for reducing nickel oxide (NiO) under the above conditions.

As shown in FIG. 1, when nickel oxide (NiO) is reduced in the above procedure, the K-edge absorption spectrum corresponding to NiO changes in directions indicated by the arrows in accordance with the reduction level (or as the reduction process time elapses), namely, changes so as to come close to the K-edge absorption spectrum corresponding to nickel metal. The K-edge absorption spectrum corresponding to NiO is high at the beginning of the reduction, and the peak spectrum becomes lower as the reduction proceeds (as the time elapses). First, as shown in FIG. 1, the K-edge absorption spectrum is measured for a NiO standard sample (before reduction) and Ni metal.

In this embodiment, the reduction rate of a Ni catalyst in an electrode material is determined by LCF (linear combination fitting) analysis using a combination of the K-edge absorption spectra corresponding to the NiO standard sample and the Ni metal.

Figure 2:
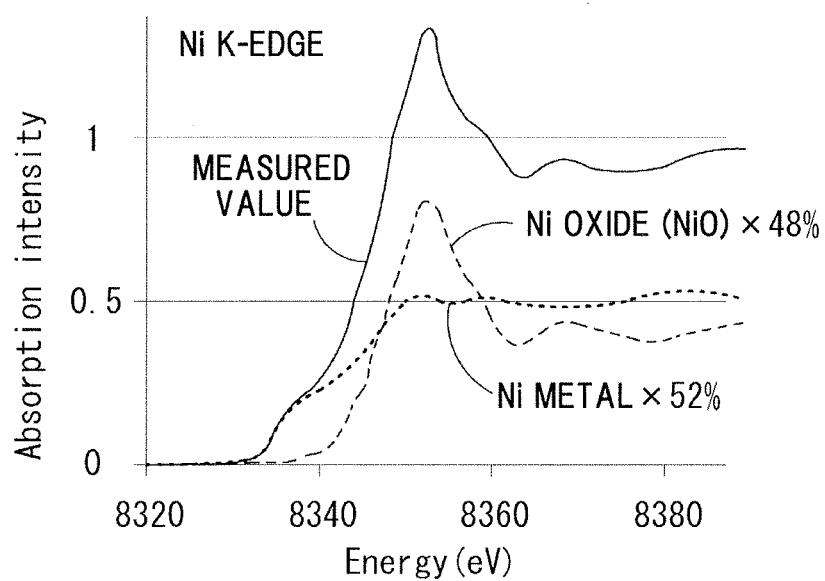
FIG. 2 is a graph showing a process for fitting the data of nickel oxide (NiO) and nickel metal to the X-ray absorption fine structure spectroscopy data of the nickel oxide during a reduction process to obtain the reduction rate of the measured nickel oxide.

Specifically, as shown in FIG. 2, the K-edge absorption spectrum corresponding to nickel oxide (NiO) in the measured electrode material is subjected to the fitting assuming that the K-edge absorption spectra corresponding to the nickel oxide (NiO standard sample) and the Ni metal appear at a ratio reflecting the reduction rate. In the example of FIG. 2, 48% of the K-edge absorption spectrum corresponding to the NiO standard sample and 52% of the K-edge absorption spectrum corresponding to the Ni metal are combined to form the spectrum corresponding to the measured nickel oxide. The percentage, namely 52%, of the K-edge absorption spectrum of the Ni metal is defined as a reduction rate. This method enables numerical measurement of the reduction rate of nickel oxide.

[Overview of Embodiment According to Present Invention]

According to an aspect of the present invention, an electrode catalyst material for fuel cells contains nickel oxide and cobalt oxide. The electrode catalyst material contains a cobalt metal component in an amount of 2 to 15 mass % with respect to the total mass of a nickel metal component and the cobalt metal component.

The reduction rate of a nickel catalyst material containing a cobalt metal component is measured by using the above procedure for measuring the reduction rate. As a result, the reduction rate is higher than that in the case of only metal nickel. That is, adding the cobalt metal component increases the reduction rate of nickel and thus improves the catalytic function to increase the efficiency of fuel cells.

The cobalt metal component is added as cobalt oxide, which is reduced together with nickel oxide. Although the reason that adding the cobalt metal component increases the reduction rate of nickel is not known, it is assumed that, when nickel is reduced, cobalt has some effect on the reduction of nickel to increase the reduction rate.

Examples of the nickel oxide that can be used in this embodiment include NiO and $Ni_2O_3$. Examples of the cobalt oxide that can be used include CoO, $Co_2O_3$, and $CO_3O_4$. In addition, Ni—Co composite oxides, such as $NiCo_2O_4$, can be used.

The cobalt metal component can be added in an amount of 2 to 15 mass % with respect to the total mass of the nickel metal component and the cobalt metal component. The addition of less than 2 mass % of the cobalt metal component fails to increase the reduction rate of nickel. The addition of more than 15 mass % of the cobalt metal component not only decreases the reduction rate but also increases the cost of a cobalt raw material to increase the total production cost. To increase the reduction rate and decrease production costs, the cobalt metal component is preferably added in an amount of 5 mass % or less.

Figure 4:
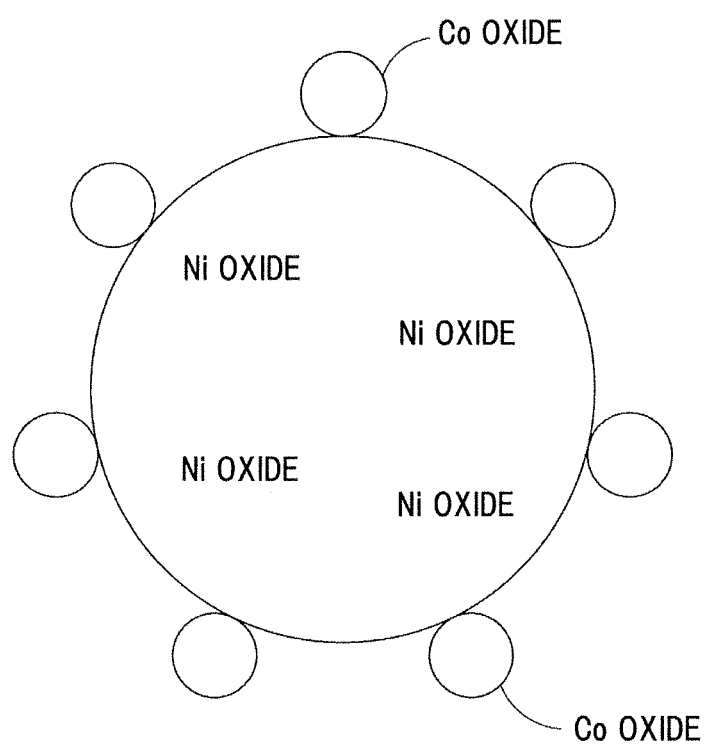
FIG. 4 is a schematic diagram of the structure of a catalyst material according to the present invention formed by an impregnation method.

As shown in FIG. 4, the catalyst material according to this embodiment has a structure in which the cobalt oxide is dispersedly supported on a partial or entire outer surface of the nickel oxide. The particle size of the nickel oxide is preferably set to 0.5 to while the particle size of the cobalt oxide is preferably set to 0.1 to 5 μm.

The use of a Ni—Co oxide having the above structure can further increase the reduction rate of Ni. The Ni—Co oxide can be formed by an impregnation method. Although the specific reason that the reduction rate of the Ni oxide in the Ni—Co oxide formed by an impregnation method increases is not known, it is assumed that the Ni oxide and the Co oxide in the Ni—Co oxide are more closely combined with each other than a simple mixture of Ni oxide and Co oxide, and as a result a Co component has a large effect on the reduction of a Ni component.

To mold an electrode and obtain a desired reduction rate, the catalyst material containing the Ni—Co oxide preferably includes 50% or more of oxide composite particles having particle sizes of 1 μm to 50 μm The use of oxide composite particles having particle sizes of less than 1 μm increases the cost for grinding. Oxide composite particles having particle sizes of more than 50 μm have fewer active sites and thus decrease catalytic activity. To ensure the catalytic function, the catalyst material preferably includes 50% or more of particles having the above particle sizes.

The electrode catalyst material can be used as various electrode materials to form an electrode. In general, the electrode catalyst material and a solid electrolyte used in a solid electrolyte layer of a fuel cell are mixed together, molded, and sintered to form an electrode of a fuel cell.

Examples of solid electrolytes that can be used to form the electrode include yttria-stabilized zirconia (YSZ), yttrium-doped barium cerate (BCY), yttrium-doped barium zirconate (BZY), scandia-stabilized zirconia (SSZ), and lanthanum strontium gallium manganite (LSGM). The electrode catalyst material is kneaded together with the solid electrolyte material, molded, and then sintered. The electrode material according to this embodiment can be used to form not only an anode but also a cathode.

To obtain the function of the catalyst material, the catalyst material needs to be reduced to produce nickel metal. Thus, the catalyst material is reduced by performing heating to 400° C. in a hydrogen atmosphere. In this embodiment, the reduction rate of the nickel oxide is preferably set to 95% or more. With such a reduction rate, a larger amount of nickel metal than before is produced in an electrode to increase catalytic activity and thus improve the efficiency of a fuel cell.

The electrode catalyst material is produced by a method including a step of adding cobalt oxide to nickel oxide by an impregnation method in such a manner that the electrode catalyst material contains a cobalt metal component in an amount of 2 to 15 mass % with respect to the total amount of a nickel metal component and the cobalt metal component.

It is preferred that cobalt oxide particles be dispersedly supported on a partial or entire surface of nickel oxide particles by using an impregnation method. The reduction rate of the nickel oxide can be improved by dispersedly supporting the cobalt oxide on the surface of the nickel oxide.

It is found that adding iron oxide instead of cobalt oxide when reducing nickel oxide also improves the reduction rate of the nickel oxide.

An electrode material including the iron oxide contains nickel oxide and the iron oxide. The electrode material preferably contains an iron metal component in an amount of 2 to 10 mass % with respect to the total mass of a nickel metal component and the iron metal component.

When the proportion of the iron metal component contained is less than 2 mass %, a desired nickel reduction rate cannot be obtained. When the proportion of the iron metal component contained is more than 10 mass %, the reduction rate decreases.

The electrode material containing the iron oxide can be produced by a method including a step of adding the iron oxide to the nickel oxide by an impregnation method in such a manner that the electrode material contains the iron metal component in an amount of 2 to 10 mass % with respect to the total amount of the nickel metal component and the iron metal component.

An electrode catalyst material containing the iron oxide, together with various solid electrolyte materials, can form an electrode of a fuel cell in the same manner as the electrode catalyst material containing the cobalt oxide. In the electrode, the reduction rate of the Ni component is preferably set to 95% or more. The efficiency of a fuel cell can be increased accordingly.

[Details Of Embodiment Of Present Invention]

Detailed description of the embodiment is given below.

[Preparation of Samples by Impregnation Method]

As shown in FIG. 3, catalyst materials containing a Co component are prepared by mixing a given amount of NiO powder with a given amount of $Co(NO_3)_2.6H_2O$. Catalyst materials containing a Fe component are prepared by mixing a given amount of NiO powder with a given amount of $Fe(NO_3)_3.9H_2O$. The last two-digit number of each sample name denotes the mass % of the Co metal component relative to the total mass of the Ni metal component and the Co metal component or denotes the mass % of the Fe metal component relative to the total mass of the Ni metal component and the Fe metal component.

Nickel oxide (NiO) is added to 150 mL of pure water obtained by ion exchange. After the mixture is stirred at room temperature for 10 minutes, $Co(NO_3)_2.6H_2O$ and $Fe(NO_3)_3.9H_2O$ are added. Pure water is added to make a total volume of 300 mL, and a stirring bar is introduced to the mixture, which is further stirred with a stirring device under heating at 80° C. or more. When water is evaporated from the solution to 50 mL or less, the stirring bar is removed and water is further evaporated under stirring with a glass rod.

The powder obtained by the above procedure is placed in a crucible, heated to 400° C. over one hour, and maintained at 400° C. for two hours, followed by cooling. The resulting material is then ground with a mortar for 30 minutes.

The powder obtained by the above procedure is heated to 1200° C. over six hours and maintained at 1200° C. for six hours, followed by cooling.

Next, in a ball mill, ethanol is added to the powder and the powder is then milled for 12 hours, followed by evaporation of ethanol. The above procedure gives a nickel catalyst material containing cobalt oxide and a nickel catalyst material containing iron oxide.

In the above samples, as shown in FIG. 4, the cobalt oxide or the iron oxide is supported on a partial or entire outer surface of the nickel oxide.

[Molding of Catalyst Material]

EC Vehicle (Nisshin Kasei, Co., Ltd., EC Vehicle, prototype 3-097) is added to the catalyst material obtained by the above procedure. The mixture is subjected to uniaxial compression molding to provide a pressed powder compact having a diameter of 10 mm and a thickness of 1 mm.

[XAFS Spectrometer]

Figure 5:
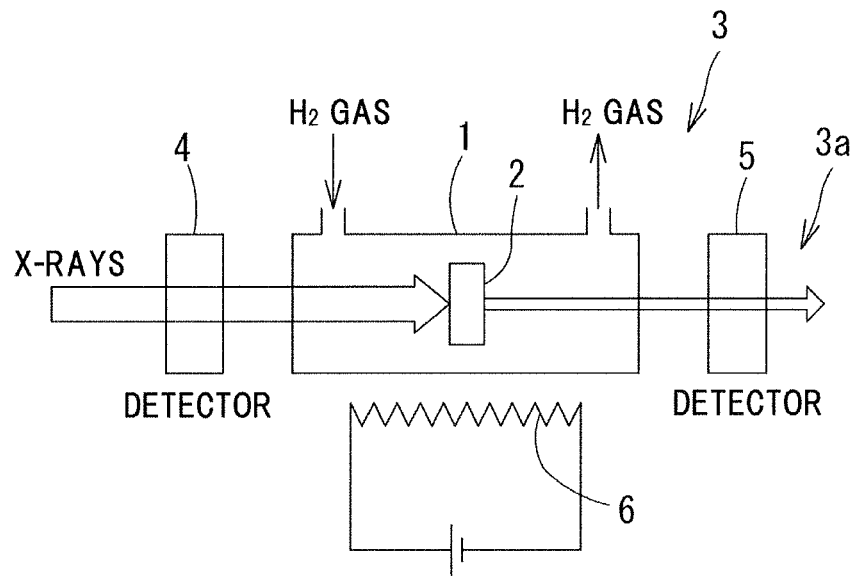
FIG. 5 is a diagram showing an example of an X-ray absorption fine structure (XAFS) spectrometer according to an embodiment.

In a spectrometer 3 according to this embodiment, as shown in FIG. 5, a sample 2 is reacted with hydrogen gas while the sample 2 is heated with a heater 6 to reproduce the initial reduction process of a fuel cell, and the reduction rate is measured. The sample 2 is thus placed in a container 1 through which hydrogen gas can circulate, this container is disposed between detectors 4 and 5 of a XAFS spectrometer 3a, and the reduction rate is measured.

[Measurement of Reduction Rate]

Figure 6:
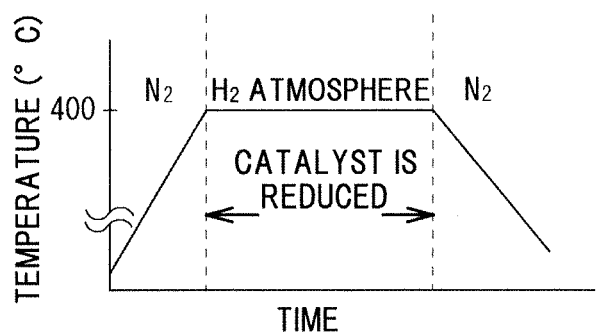
FIG. 6 is a graph showing changes in temperature and gas atmosphere during a heating process in the measurement.

As shown in FIG. 6, the sample 2 is heated to 400° C. over a predetermined time in a nitrogen atmosphere. At a temperature of 400° C., helium gas containing 3% of hydrogen is circulated, and the reduction rate is measured every 90 seconds by the above procedure. Nickel oxide (NiO standard sample) and the sample are subjected to the measurement, and the reduction rate of Ni in the sample is determined by the above procedure. The reduction rates of the cobalt oxide and the iron oxide added are also determined, and the total reduction rate relative to the total mass of catalytic metals is also determined from these reduction rates.

[Measurement Results]

Figure 7:
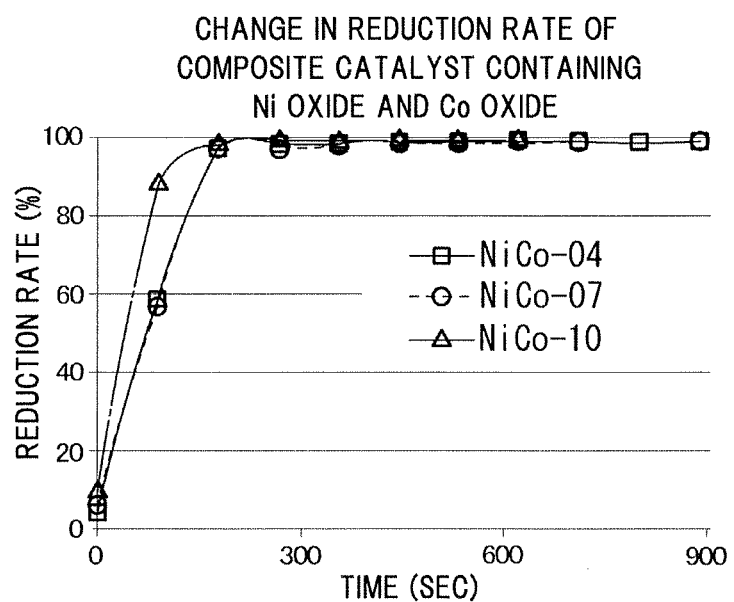
FIG. 7 is a graph showing the time course of the reduction rate of composite catalysts containing Ni oxide and Co oxide.
Figure 8:
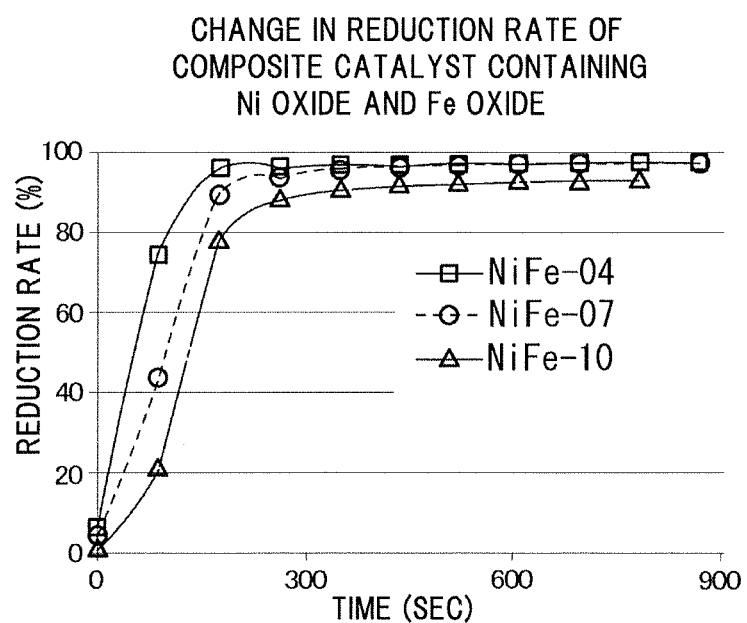
FIG. 8 is a graph showing the time course of the reduction rate of composite catalysts containing Ni oxide and Fe oxide.
Figure 9:
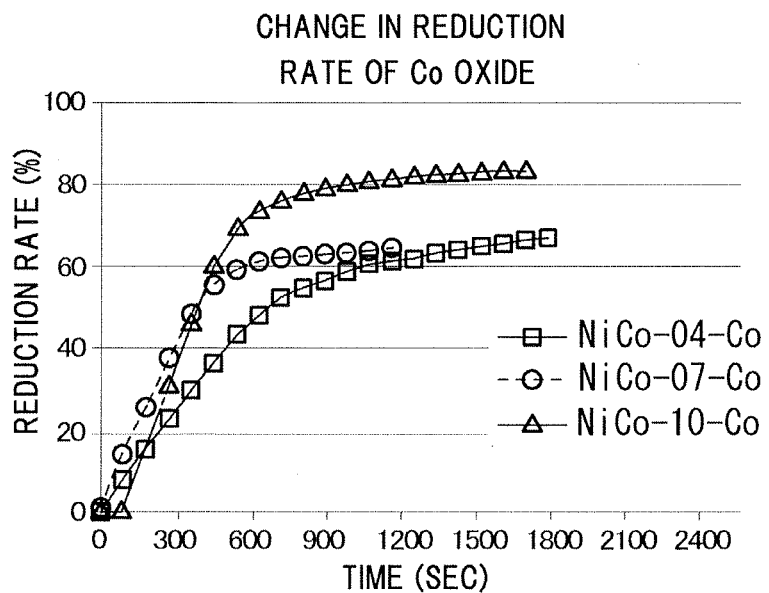
FIG. 9 is a graph showing the time course of the reduction rate of the Co oxide according to FIG. 7.
Figure 10:
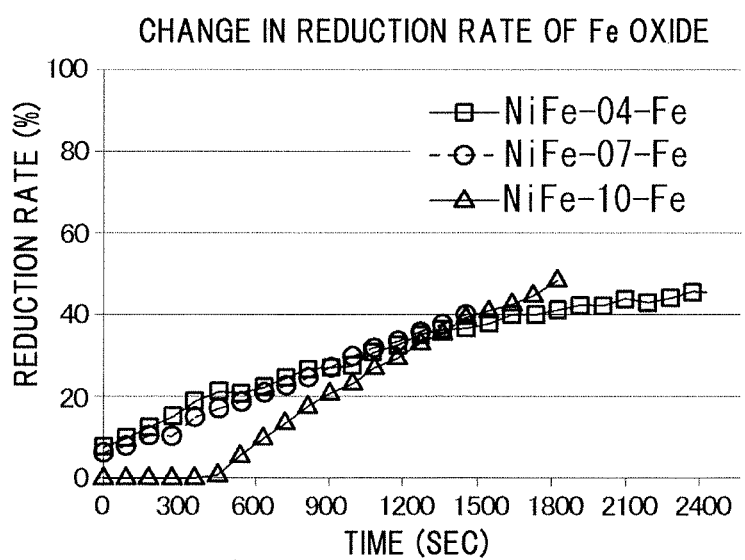
FIG. 10 is a graph showing the time course of the reduction rate of the Fe oxide according to FIG. 8.

FIG. 7 is a graph showing the time course of the reduction rate of composite catalysts containing nickel oxide and cobalt oxide. FIG. 8 is a graph showing the time course of the reduction rate of composite catalysts containing nickel oxide and iron oxide. FIG. 9 shows the time course of the reduction rate of the cobalt oxide according to FIG. 7. FIG. 10 shows the time course of the reduction rate of the iron oxide according to FIG. 8.

FIG. 7 indicates that the nickel oxide having 4 to 7 mass % of the cobalt oxide added is reduced at a high reduction rate of more than 90% in several minutes. FIG. 8 indicates that the nickel oxide having 10 mass % or less of the iron oxide is also reduced at a high reduction rate of more than 90% in several minutes.

As shown in FIG. 9, the reduction rate of the cobalt oxide increases as the amount of cobalt metal contained increases, but the reduction rate of the cobalt oxide is not as high as that of the nickel oxide. As shown in FIG. 10, the reduction rate of the iron oxide is not notably affected by the amount of iron metal added. The reduction rates of the iron oxide change with a similar tendency.

Figures 11, 12:
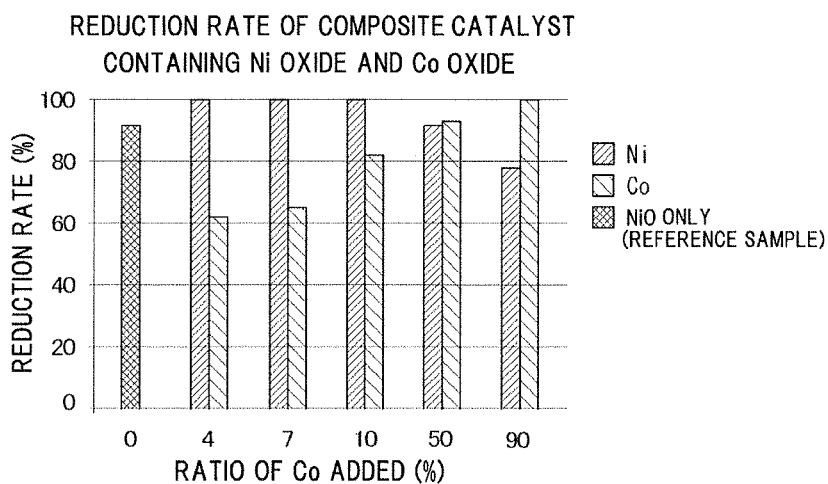
FIG. 11 is a table showing the reduction rate of composite catalysts containing Ni oxide and Co oxide.
FIG. 12 is a bar graph showing the reduction rate of the Ni oxide and the Co oxide in FIG. 11.

FIG. 11 and FIG. 12 show a table and a bar graph indicating the reduction rate of the nickel oxide after the reduction process. The reduction rates shown in FIG. 11 to FIG. 14 are measured values after 900 seconds.

As shown in these figures, the reduction rate of the NiO standard sample (the ratio of Co added is 0 mass %) is 92%. When the nickel oxide having 4 to 10% of the cobalt oxide added is reduced, the reduction rate of the nickel oxide is 100%, which is a reduction rate higher than that in the related art. It is also found that the reduction rate of the nickel oxide exceeds the reduction rate of the NiO standard sample when the amount of the cobalt metal component added is up to about 50 mass %. The total reduction rate of the nickel oxide and the cobalt oxide also exceeds the reduction rate of the NiO standard sample when the amount of the cobalt metal component added is up to about 50 mass %. As the proportion of the cobalt metal component contained increases, not only the reduction rate decreases but also the production cost increases, which is because cobalt oxide is more expensive than nickel oxide. Thus, the proportion of the cobalt metal component contained is preferably set to 2 to 15 mass %. In particular, the proportion of the cobalt metal component contained is preferably set to 2 to 10 mass %.

The measurement results described above indicate that the nickel reduction rate is increased and thus the conductivity and the like are also increased by forming an electrode of a fuel cell by this procedure. The efficiency of the fuel cell can be increased accordingly.

Since the relationship between the reduction rate of the catalyst and the reduction process time is determined, the time for the initial reduction process can be also shortened.

Figures 13, 14:
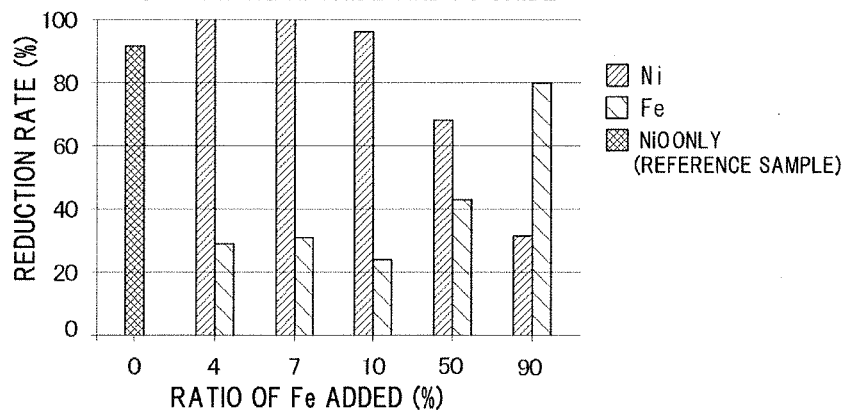
FIG. 13 is a table showing the reduction rate of composite catalysts containing Ni oxide and Fe oxide.
FIG. 14 is a bar graph showing the reduction rate of the Ni oxide and the Fe oxide in FIG. 13.

Similarly, as shown in FIG. 13 and FIG. 14, the reduction rate of the nickel oxide having 4 to 10 mass % of the iron metal component added is higher than that of the NiO standard sample (the ratio of Fe added is 0 mass %). The total reduction rate also changes with a similar tendency. However, the reduction rate of the nickel oxide notably decreases when the amount of the iron metal component added exceeds 10 mass %. Thus, the amount of the iron metal component added is preferably set to 2 to 10 mass %.

In the case of catalyst materials obtained by simply mixing the above oxide powders without using an impregnation method, for example, the reduction rate of a Ni—Fe catalyst containing 10 mass % of the Fe metal component is 54%, and the reduction rate of a Ni—Co catalyst containing 50 mass % of the Co metal component is 80%.

The above electrode catalyst material is used to form an electrolyte-electrode layered body of a fuel cell. To form, for example, an electrolyte-electrode layered body including an electrolyte layer formed of YSZ, the above electrode material and YSZ powder are milled and kneaded with a ball mill and then uniaxially molded to form a tabular compact having a desired shape. The tabular compact is calcined at 1000° C. and then an YSZ paste that is to form an electrolyte layer is applied to the calcined tabular compact by screen printing. The resulting compact is heated to 750° C. to remove a binder for molding and then integrally sintered at 1000° C. Subsequently, a lanthanum strontium cobalt ferrite material (LSFC) that is to form an air electrode is applied in a layered manner and fired at 1000° C. A Pt mesh that serves as an air electrode current collector and a nickel porous body that serves as a fuel electrode collector are provided to give an electrolyte-electrode layered body for the SOFC. A fuel cell is formed by using this electrolyte-electrode layered body and subjected to the initial reduction process described above before operation.

The solid electrolyte is not limited to a particular type, and various solid electrolytes to be employed in an electrolyte layer and the catalyst material according to the embodiment can be used to form an electrode.

The scope of the present invention is not limited to the aforementioned embodiment. The embodiment disclosed herein is illustrative only in every respect and should not be construed as restrictive. The scope of the present invention is given not by the above meaning but by the claims and is intended to include all modifications within the meaning and scope equivalent to the claims.

INDUSTRIAL APPLICABILITY

The reduction rate of a catalyst is increased to form a fuel cell with high efficiency.

REFERENCE SIGNS LIST

1 Container
2 Sample

3 X-ray absorption fine structure (XAFS) spectrometer including container in which sample according to embodiment is disposed
3a X-ray absorption fine structure (XAFS) spectrometer
4 Detector
5 Detector
6 Heater

The invention claimed is:

1. An electrode catalyst material for solid oxide fuel cells, comprising nickel oxide and cobalt oxide, and
comprising a structure in which cobalt oxide particles are dispersedly supported on a partial surface of nickel oxide particles;
wherein the electrode catalyst material contains a cobalt metal component in an amount of 2 to 15 mass % with respect to the total mass of a nickel metal component and the cobalt metal component,
wherein the particle size of the nickel oxide is 0.5 μm to 10 μm,
wherein the particle size of the cobalt oxide is 0.1 μm to 5 μm, and
wherein the particle size of the cobalt oxide is smaller than the particle size of the nickel oxide.

2. The electrode catalyst material according to claim 1, comprising 50% or more of Ni—Co oxide composite particles having particle sizes of 1 μm to 50 μm.

3. A fuel cell electrode formed by using the electrode catalyst material according to claim 1.

4. The fuel cell electrode according to claim 3, wherein a reduction rate of the Ni component is 95% or more.

5. A method for producing an electrode catalyst material for fuel cells that contains nickel oxide and cobalt oxide, the method comprising:
a step of adding the cobalt oxide to the nickel oxide by an impregnation method in such a manner that the electrode catalyst material contains a cobalt metal component in an amount of 2 to 15 mass % with respect to the total amount of a nickel metal component and the cobalt metal component, and
comprising a structure in which cobalt oxide particles are dispersedly supported on a partial surface of nickel oxide particles,
wherein the particle size of the nickel oxide is 0.5 μm to 10 μm,
wherein the particle size of the cobalt oxide is 0.1 μm to 5 μm, and
wherein the particle size of the cobalt oxide is smaller than the particle size of the nickel oxide.

6. An electrode catalyst material for fuel cells, comprising nickel oxide and iron oxide, and
comprising a structure in which iron oxide particles are dispersedly supported on a partial surface of nickel oxide particles;
wherein the electrode catalyst material contains an iron metal component in an amount of 2 to 10 mass % with respect to the total mass of a nickel metal component and the iron metal component,
wherein the particle size of the nickel oxide is 0.5 μm to 10 μm,
wherein the particle size of the iron oxide is 0.1 μm to 5 μm, and
wherein the particle size of the iron oxide is smaller than the particle size of the nickel oxide.

7. A method for producing an electrode catalyst material for fuel cells that contains nickel oxide and iron oxide, the method comprising:
a step of adding the iron oxide to the nickel oxide by an impregnation method in such a manner that the electrode catalyst material contains an iron metal component in an amount of 2 to 10 mass % with respect to the total amount of a nickel metal component and the iron metal component, and
comprising a structure in which iron oxide particles are dispersedly supported on a partial surface of nickel oxide particles,
wherein the particle size of the nickel oxide is 0.5 μm to 10 μm,
wherein the particle size of the iron oxide is 0.1 μm to 5 μm, and
wherein the particle size of the iron oxide is smaller than the particle size of the nickel oxide.

8. A fuel cell electrode formed by using the electrode catalyst material according to claim 6.

9. The fuel cell electrode according to claim 8, wherein a reduction rate of the Ni component is 95% or more.

10. A fuel cell comprising an electrode formed by using the electrode catalyst material according to claim 1.

11. A fuel cell comprising an electrode formed by using the electrode catalyst material according to claim 6.

* * * * *